(12) United States Patent
Komatsu et al.

(10) Patent No.: US 7,173,249 B2
(45) Date of Patent: Feb. 6, 2007

(54) NUCLEAR MEDICAL DIAGNOSTIC APPARATUS AND METHOD FOR DETECTING RADIATION

(75) Inventors: Hisataka Komatsu, Kanagawa-ken (JP); Junji Baba, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 235 days.

(21) Appl. No.: 10/870,021

(22) Filed: Jun. 18, 2004

(65) Prior Publication Data

US 2005/0017183 A1    Jan. 27, 2005

(30) Foreign Application Priority Data

Jun. 20, 2003   (JP)   ............................. 2003-177073

(51) Int. Cl.
*G01T 1/166* (2006.01)
(52) U.S. Cl. ...................... 250/363.05; 250/363.08; 378/13
(58) Field of Classification Search ........... 250/363.05, 250/363.08
See application file for complete search history.

(56) References Cited

U.S. PATENT DOCUMENTS

| | | | | |
|---|---|---|---|---|
| 5,523,571 A | * | 6/1996 | Velazquez et al. | 250/363.05 |
| 5,760,402 A | * | 6/1998 | Hug et al. | 250/363.05 |
| 6,043,494 A | * | 3/2000 | Yamakawa et al. | 250/363.04 |
| 6,097,030 A | * | 8/2000 | Tokarski et al. | 250/363.04 |
| 6,163,027 A | * | 12/2000 | Nakamura et al. | 250/363.04 |
| 6,204,503 B1 | * | 3/2001 | Pierfitte et al. | 250/363.05 |
| 6,373,060 B1 | * | 4/2002 | Yamakawa et al. | 250/363.08 |

FOREIGN PATENT DOCUMENTS

| | | |
|---|---|---|
| JP | 4-62492 | 2/1992 |
| JP | 11-211833 | 8/1999 |

* cited by examiner

*Primary Examiner*—Albert Gagliradi
(74) *Attorney, Agent, or Firm*—Finnegan, Henderson, Farabow, Garret & Dunner, L.L.P.

(57) ABSTRACT

A method for detecting radiation emitted from a radiation source within a subject. A radiation detector is moved in approximately parallel with the direction of the body axis of the subject. The detector is rotated about the body axis. The distance between the subject and the detector is changed. The radiation is detected by the detector.

9 Claims, 10 Drawing Sheets

FIG. 10

NUCLEAR MEDICAL DIAGNOSTIC APPARATUS AND METHOD FOR DETECTING RADIATION

CROSS REFERENCE TO RELATED APPLICATION OF THE INVENTION

This application is based upon and claims the benefit of priority from prior Japanese Patent Application No. 2003-177073 filed on Jun. 20, 2003, the entire contents of which are incorporated herein by reference.

TECHNICAL FIELD

The present invention relates to a nuclear medical diagnostic apparatus, and a method for detecting radiation. In particular, the present invention relates to a nuclear medical diagnostic apparatus for obtaining an image by detecting radiation emitted from radioactive ingredient administered to a subject, and a method for detecting radiation emitted from radioactive ingredient administered to a subject.

DESCRIPTION OF THE RELATED ART

A nuclear medical diagnostic apparatus is classified into two types. The first type is a so-called single photon camera, which detects a single photon (gamma ray) generated and emitted from single-photon type RI (Radio Isotope) at the time of the disintegration of the RI. The first type can produce a two-dimensional image by accumulating data obtained by the detections.

The second type is a so-called positron camera, which detects a pair of photons which are generated at the time of annihilation of a positron. Since the pair of photons travel in the direction opposite to each other, the second type can identify the position of the positron. As a result, a two-dimensional image can be produced by accumulating data of the identified positions.

The recent main medical diagnostic apparatus among the single photon cameras is a SPECT (Single Photon Emission Computed Tomography) apparatus, which can produce a tomogram of the distribution of the gamma rays inside a subject (a living body) to be inspected.

A Japanese patent publication (kokai) No. 04-62492, shows a conventional SPECT apparatus with three detectors to detect gamma ray. The apparatus is provided with a mechanism to linearly and roundly move at least the two detectors. The relative angle between the two detectors are arranged so as to minimize the physical interference between them while acquiring SPECT data.

Another Japanese patent publication (kokai) No. 11-211833, shows a nuclear medical diagnostic apparatus having a detector attached inside a rotatable ring. The apparatus has a pantograph-type link mechanism to adjust the distance between the detector and a subject to be inspected.

The publication also shows an apparatus with two detectors, arranged in 90 degree interval to shorten SPECT data acquisition time. The apparatus produces a tomogram of a heart of a subject by reconstructing 180-degree projection data acquired respectively.

The first publication shows a nuclear medical diagnostic apparatus with three detectors. The second publication shows the apparatus from one to three detectors. An apparatus with four detectors is also known.

By manipulating these detectors into various positions, it is possible to detect radiation traveling various directions.

However, conventional nuclear medical diagnostic apparatuses as described above, have problems explained next.

First, it is difficult to easily change a relative angle between detectors. Providing plural rotatable rings with one fixed ring to overcome the first problem, makes the structure of the apparatus complicated and heavy; which is a significant disadvantage.

Second, it is difficult to co-currently carry out SPECT data acquisition with one detector and a so-called whole-body diagnosis with the other.

Third, it is difficult to obtain an image centering about any desired three-dimensional position inside a head of a subject by rotating a detector on its axis to scan through its parietal region to its jaw.

SUMMARY

Consistent with the present invention, there is provided a nuclear medical diagnostic apparatus for detecting radiation emitted from a radiation source within a subject. The apparatus comprises a base which is moveable in a linear direction, a circular ring configured to move along with the base, a first gear provided inside the circular ring, a second gear engaged with the first gear to move in the circumferential direction of the ring, a first moving component moveable along a first axis configured to move along with the second gear in the circumferential direction of the ring, a second moving component cooperating with the first moving component, a table coupled to the second moving component to move in a direction parallel with the first axis, and a detector to detect the radiation, the detector configured to move along with the table.

In another aspect consistent with the present invention, there is provided a method for detecting radiation emitted from radioactive ingredient administered in a subject. The method comprises moving a detector to detect the radiation in approximately parallel with the direction of the body axis of the subject, rotating the detector about the body axis, changing the distance between the subject and the detector, and detecting the radiation using the detector.

DETAILED DESCRIPTION

A first embodiment of a nuclear medical diagnostic apparatus is explained next with reference to FIGS. 1 to 5.

In the first embodiment, the nuclear medical diagnostic apparatus has only one single detector in order to outline the basic structure of the apparatus briefly. However, the apparatus may have a plurality of detectors as shown in the second embodiment.

In general, a source of radiation, such as a gamma ray source, is ingested into the body of a subject P. Radiation emitted from the radiation source is detected by a detector placed in varying positions related to subject P, and diagnostic information is derived from the patterns of detected radiation.

Figure 1:
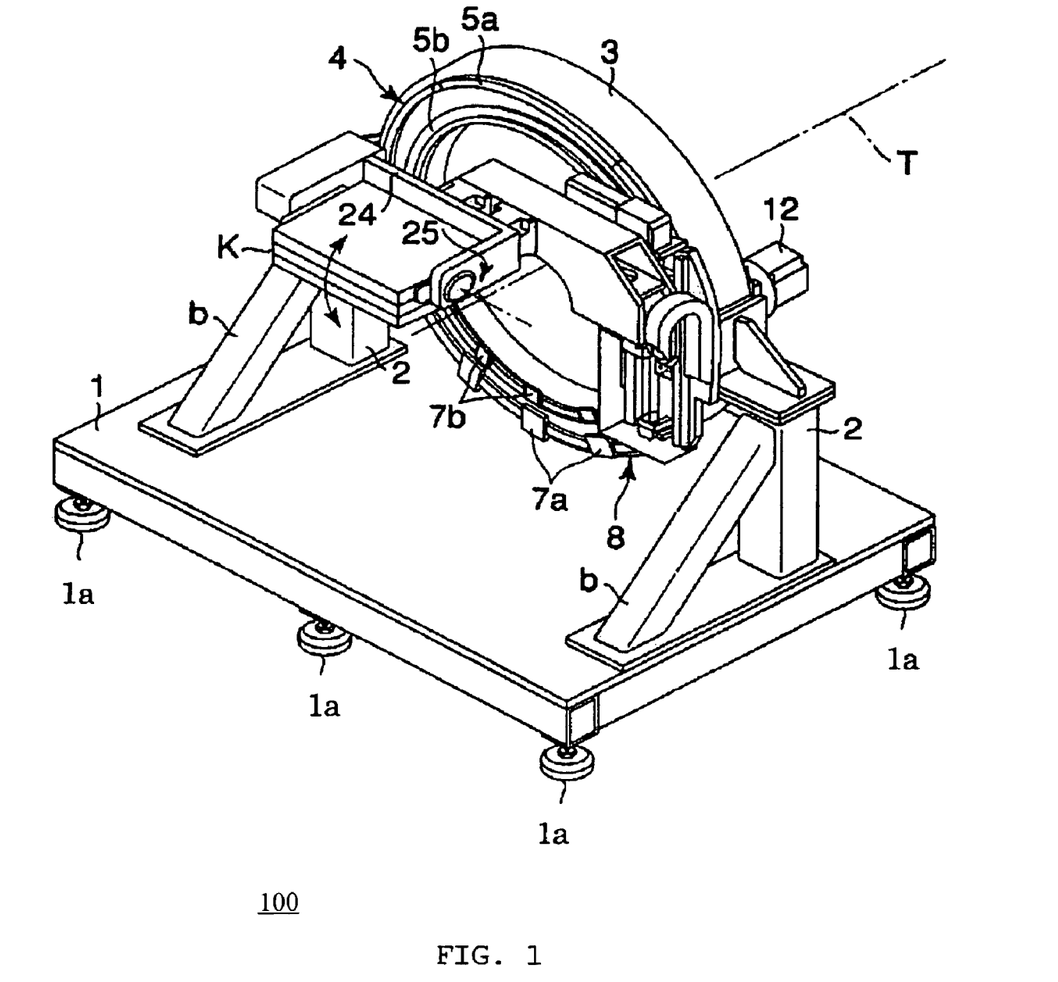
FIG. 1 is an oblique view of a first embodiment of a nuclear medical diagnostic apparatus, consistent with the invention.
Figure 2:
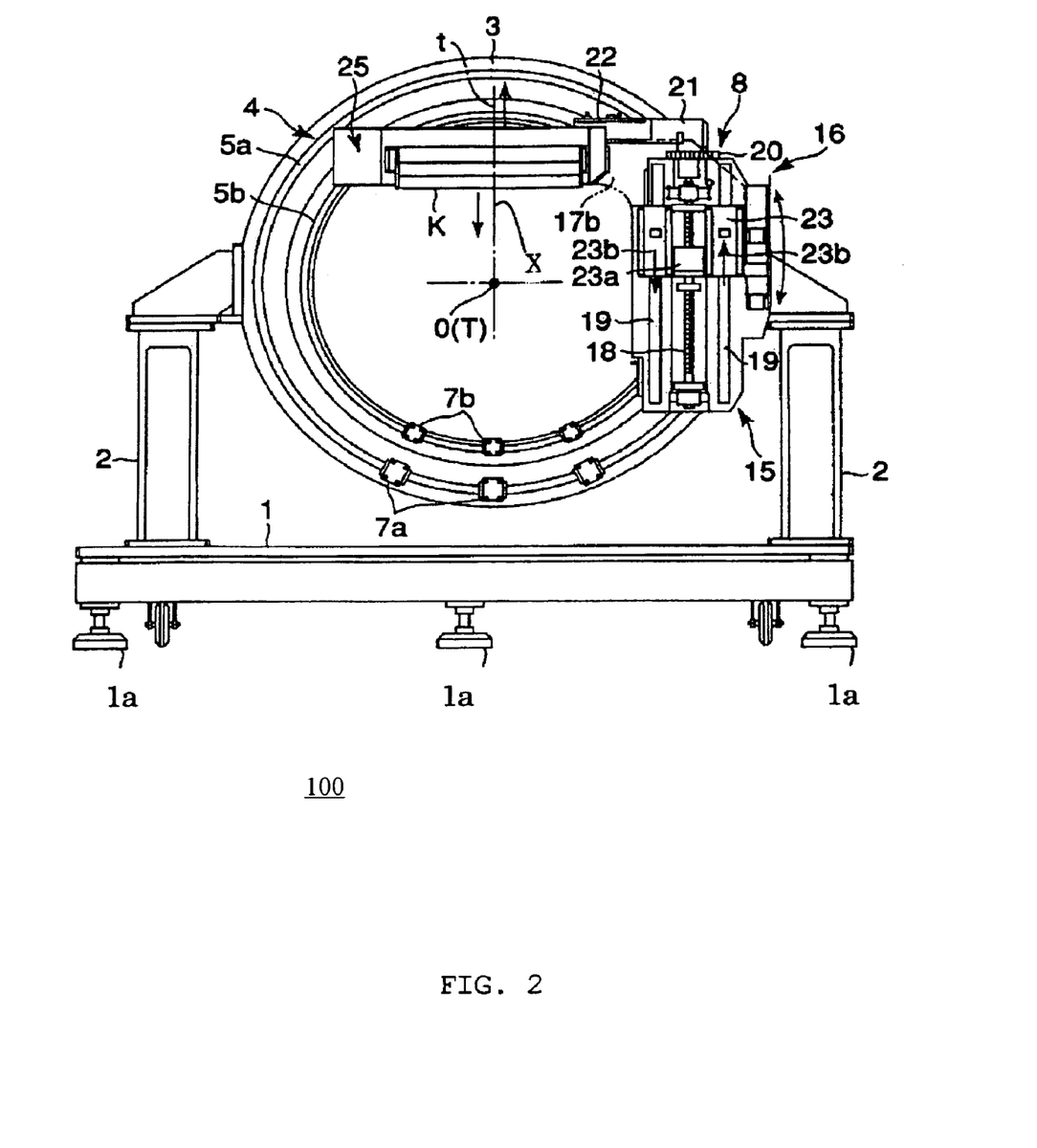
FIG. 2 is a front view of the nuclear medical diagnostic apparatus shown in FIG. 1.
Figure 3:
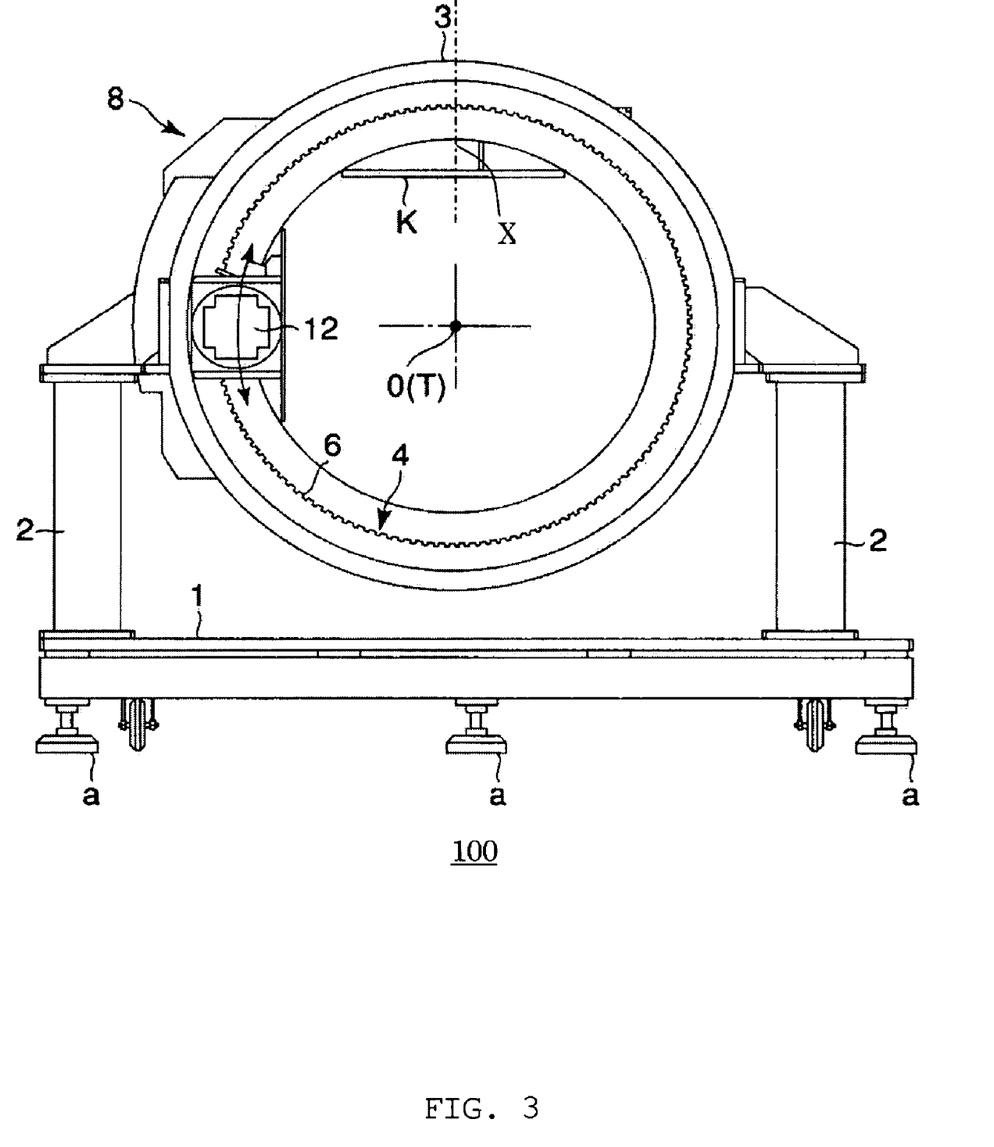
FIG. 3 is a back view of the nuclear medical diagnostic apparatus shown in FIG. 1.
Figure 4:
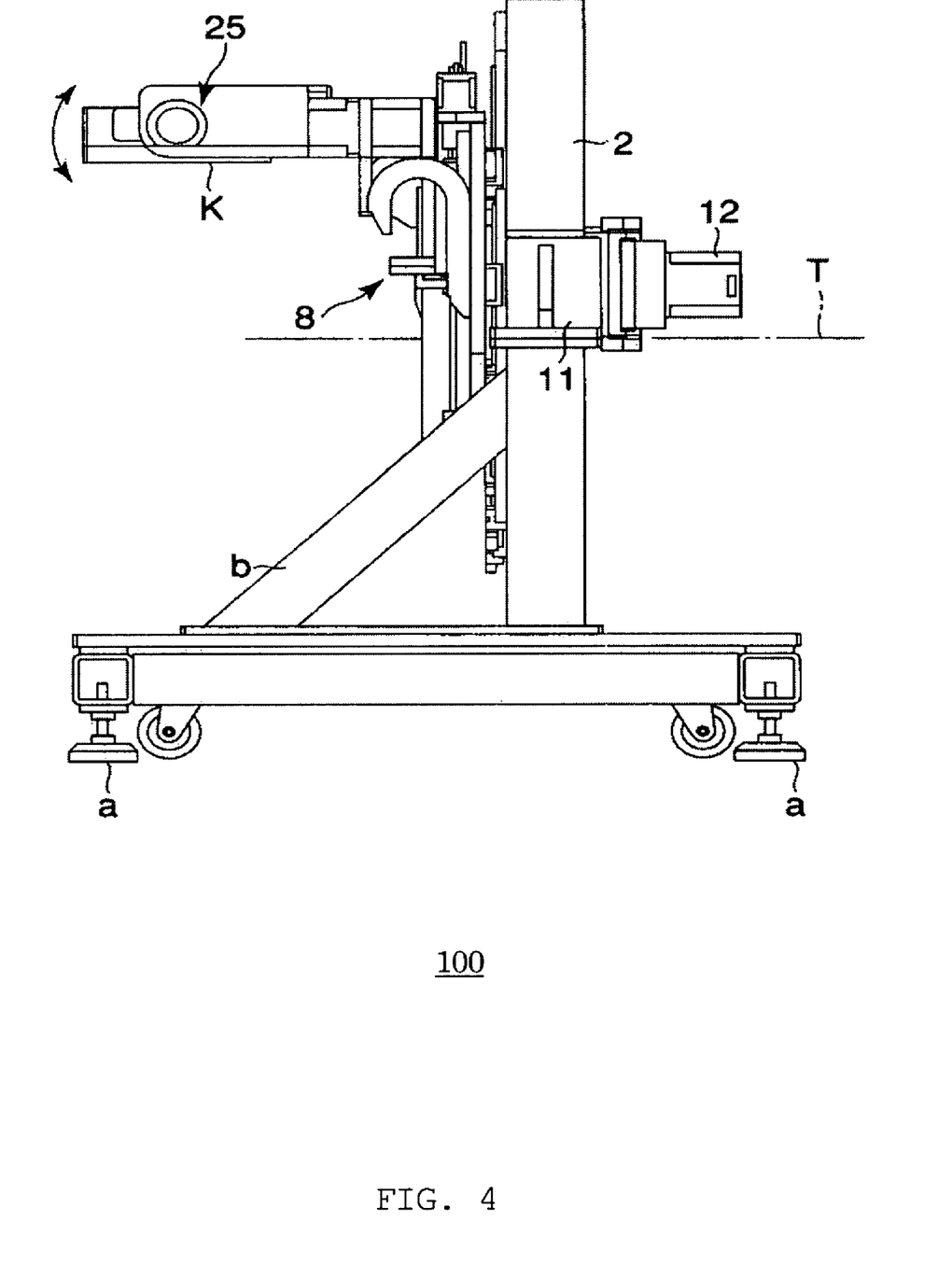
FIG. 4 is a side view of the nuclear medical diagnostic apparatus shown in FIG. 1.
Figure 5:
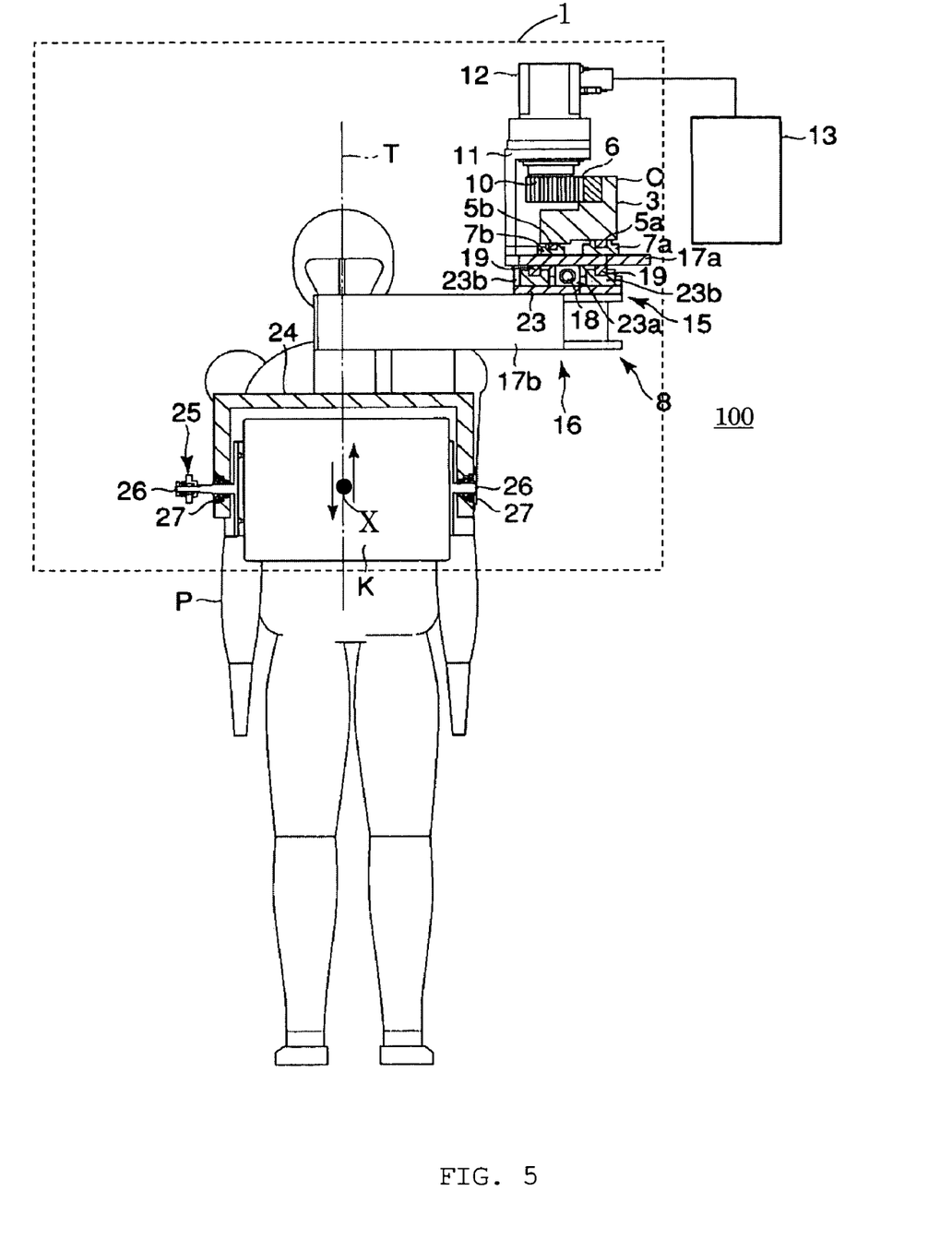
FIG. 5 is a plan view of a sustention part of the nuclear medical diagnostic apparatus shown in FIG. 1.

FIG. 1 shows an oblique view of a nuclear diagnostic medical apparatus 100. FIG. 2 shows a front view of apparatus 100. FIG. 3 shows a back view of apparatus 100. FIG. 5 shows a structure of a sustention part 8 for sustaining a detector K of apparatus 100.

Referring now to FIG. 1, a pair of supporting legs 2, respectively supported by reinforcement bars 2b, is separately secured on a base 1 in parallel with each other. Base 1 is mounted on a floor with mounting legs 1a. A circular ring 3 is supported on upper ends of legs 2.

In this embodiment, base 1 is secured on a floor face with mounting legs la in the interest of brevity. However, base 1 can be moved linearly in the direction of a body axis T of a subject P (FIG. 5) to inspect any region of subject P. For example, apparatus 100 can have a rail to guide base 1, and a driving mechanism to drive base 1 along the rail.

The inside diameter of ring 3 is 765 mm, the outside diameter of ring 3 is 1080 mm, and the thickness of ring 3 is about 20 mm. The center axis O (FIG. 2) of ring 3 is about 900 mm height from the top face of base 1.

Additionally, the center axis O is approximately aligned with a body axis T of subject P when subject P is on a berth (not shown). The inside diameter of ring 3 is set so as to let subject P inside ring 3 when subject P is decumbent on a berth during a diagnosis.

A circular guide mechanism 4 is arranged all along ring 3. Guide mechanism 4 is provided with a first circular guide rail 5a, a second circular guide rail 5b, and a first gear, such as a sun gear 6 (FIG. 3). The diameter of first guide rail 5a is a little larger than that of second guide rail 5b. Therefore guide rail 5a is arranged outside of guide rail 5b. Both the guide rails are arranged on the front face of ring 3 as shown in FIG. 2. Sun gear 6 is an internal gear, secured on an internal wall of a shoulder C which is circumferentially formed in the back side of ring 3 as shown in FIG. 3.

Each guide rail is formed by serially connecting plural arch-shaped rail portions, so that the guide rails forms an approximate perfect circle whose center is aligned with center axis O.

Three bearings 7a and three bearings 7b (FIG. 2) are respectively set in guide rails 5a and 5b, moving freely along the guide rails, and supporting sustention part 8. Bearings 7a set in guide rails 5a, are a little larger than bearings 7b set in guide rails 5b. Other bearings 7a and 7b are set in guide rails 5a and 5b as shown in FIG. 2, which bearings can be used for supporting another sustention part if necessary.

As shown in FIG. 5, sun gear 6 is engaged with a second gear, such as a spur gear 10, which is connected to a rotary shaft of a servo motor 12. Servo motor 12 is supported by a motor supporter 11. Motor supporter 11 is formed by bending a plate so as to approximately form a U-shaped section. Motor supporter 11 is arranged so as to straddle ring 3, facing with the inner side of ring 3.

Driving servo motor 12 makes spur gear 10 rotate. Then, spur gear 10, with motor supporter 11 and servo motor 12, moves in the circumferential direction of ring 3, since sun gear 6 is circumferentially formed on the inner side of ring 3. Spur gear 10 namely serves as a planet gear, and supports a detector K by way of sustention part 8. Therefore, sustention part 8 and detector K also orbit about center axis O in the circumferential direction of ring 3. Servo motor 12 is electrically connected to a controller 13, which controls the drive, stoppage and the speed of servo motor 12.

Sustention part 8 is additionally provided with an arm base 17a (FIG. 5), a main table 17b and a dynamic adjustment mechanism 15. Arm base 17a and main table 17b constitute a supporting arm 16. Adjustment mechanism 15 is arranged between arm base 17a and main table 17b.

Arm base 17a is a rectangular-shaped plate on whose back face motor supporter 11 is secured as shown in FIG. 5. Front faces of bearing blocks 7a and 7b are also secured on the back face of arm base 17a; thereby, arm base 17a is moved along rails 5a and 5b as spur gear 10 rotates. Arm base 17a is arranged along the tangent line to ring 3, shielding a part of the front face of ring 3.

Adjustment mechanism 15 is provided with a first moving component, such as a ball screw 18, and two linear guides 19. Ball screw 18 and linear guides 19 are secured on the front face of arm base 17a as shown in FIG. 2.

Ball screw 18 is attached to arm base 17a by way of a bearing (not shown). Two linear guides 19 and ball screw 18 are separately arranged in parallel with each other.

Adjustment mechanism 15 is also provided with a gear 20 (FIG. 2), a reducing gear box 21 with a bevel gear (not shown) engaged with gear 20, and servo motor 22. One end of ball screw 18 is inserted in gear 20 in order to transfer the rotation of gear 20 to ball screw 18. Servo motor 22 is mechanically connected to reducing gear box 21. Controller 13 controls servo motor 22 such as the rotative direction of servo motor 22.

The front shape of main table 17b is approximately L-shaped as shown in FIG. 2. A second moving component, such as a bracket 23 provided with an internal thread 23a and two blocks 23b, is secured on the back face of one side of main table 17b as shown in FIG. 5. Internal thread 23a receives ball screw 18, that is, ball screw 18 is threaded into internal thread 23a. Each linear guide 19 is moveably inserted in each block 23b.

Driving servo motor 22 rotates the bevel gear (not shown) at a speed reduced by gear reducer 21. The bevel gear rotates ball screw 18 by way of gear 20. Thereby, main table 17b with both internal thread 23a and blocks 23b, are moved in the axial direction of ball screw 18.

At another side of main table 17b (FIG. 5), detector K is attached by way of an arm angle 24 forming U shape in a plan view. In a front view (FIG. 2), the center axis X of detector K passes center axis o of ring 3, and the wide direction of detector K is aligned in parallel with the another side of main table 17b. Since center axis X is aligned with center axis O, center axis X is aligned with body axis T of subject P when subject P is decumbent on a berth.

Being directly fixed to main table 17b, arm angle 24 cannot move against main table 17b. Detector K is attached to arm angle 24 by way of an automatic drive mechanism 25 which rotates detector K on its axis. Thus, the axial direction of the rotation of detector K is orthogonal to the direction of body axis T.

In detail, a shaft 26 projecting from both the side faces of detector K as shown in FIG. 5, is supported by arm angle 24 by way of bearings 27. Automatic drive mechanism 25 which has a worm, a worm gear pair, a driver and so on (not shown), is provided at the end of shaft 26. The rotation of the worm gear driven by the driver, rotates shaft 26; thereby detector K rotates about shaft 26.

Detector K is a scintillation detector or a semiconductor detector. Detector K may have a collimator. In this embodiment, detector K is provided with a two-dimensional array of plural semiconductor detectors, formed of material, such as CdTe or CdZnTe, which array can make detector K have a large scope of detection, e.g. 50 cm by 38 cm. The two-dimensional array structure permits detector K to be smaller and lighter relative to a conventional detector.

Collimators (not shown) to let gamma ray traveling in a specific direction enter detector K, are arranged in front of the incident plane of detector K.

The operation of nuclear medical diagnostic apparatus 100, is described next.

First, referring to FIG. 5, base 1 is moved along the guide rail (not shown) to let subject P who is decumbent on a berth inside ring 3 (FIG. 3), and let detector K face with a region to be inspected of subject P.

Second, base 1 comes to stop when detector K comes approximately in front of the region to be inspected. After the stop, servo motor 12 is driven to rotate spur 10, so that sustention part 8 supporting detector K is moved along the circumferential direction of ring 3 until detector K is accurately positioned in front of the region to be inspected.

Third, adjustment mechanism 15 is operated. In detail, servo motor 22 is driven to rotate ball screw 18 so as to move main table 17b in the tangent direction of ring 3. Thereby, detector K supported by main table 17b is linearly moved. It is possible to make detector K approach or withdraw from the region by changing a rotative direction of servo motor 22.

Even though detector K is moved along the circumferential direction, center axis X of detector K passes perpendicularly through center axis O in a front view (FIG. 2). In addition, body axis T is approximately coaxial with center axis O. Therefore, center axis X of detector K passes perpendicularly through body axis T.

When the distance between detector K and the region to be inspected is optimum, adjustment mechanism 15 stops operating.

If necessary, mechanism 25 rotates detector K about shaft 26 so that the angle of detector K relative to the region is adjusted. Then, detector K starts detecting gamma ray emitted from the ingredient administered in subject P in order to obtain data to form an image of the region.

Detector K can be held into various postures by moving sustention part 8 in the circumferential direction of ring 3, moving main table 17b in the axial direction of ball screw 18, and rotating detector K about shaft 26.

For example, referring to FIG. 5, in diagnosing the head of subject P, concurrently moving base 1, sustention part 8, adjustment mechanism 15 and driving mechanism 25, makes it possible to obtain a longitudinal section image centering on any position inside the brain of subject P. In other words, SPECT data ranging from an occipital region (or a parietal region) to a jaw region can be acquired.

In addition, using a two-dimensional array of semiconductor detectors as detector K, lightens detector K and makes it possible to. cantilever detector K by supporting arm 16. Therefore, the interference between detector K and supporting arm 16 is minimized.

Servo motor 22 and reducing gear box 21 are arranged at a side of ball screw 18 instead of arranging them along the extension of ball screw 18. Then, rotation of servo motor 22 is transferred to ball screw 18 by way of the bevel gear and gear 20 engaged with the bevel gear. Hence, the outside dimension of apparatus 100 is downsized.

A second embodiment of a nuclear medical diagnostic apparatus is explained next, with reference to FIGS. 6 to 10. A nuclear medical diagnostic apparatus 200 according to the second embodiment, has two detectors to detect gamma ray.

Figure 6:
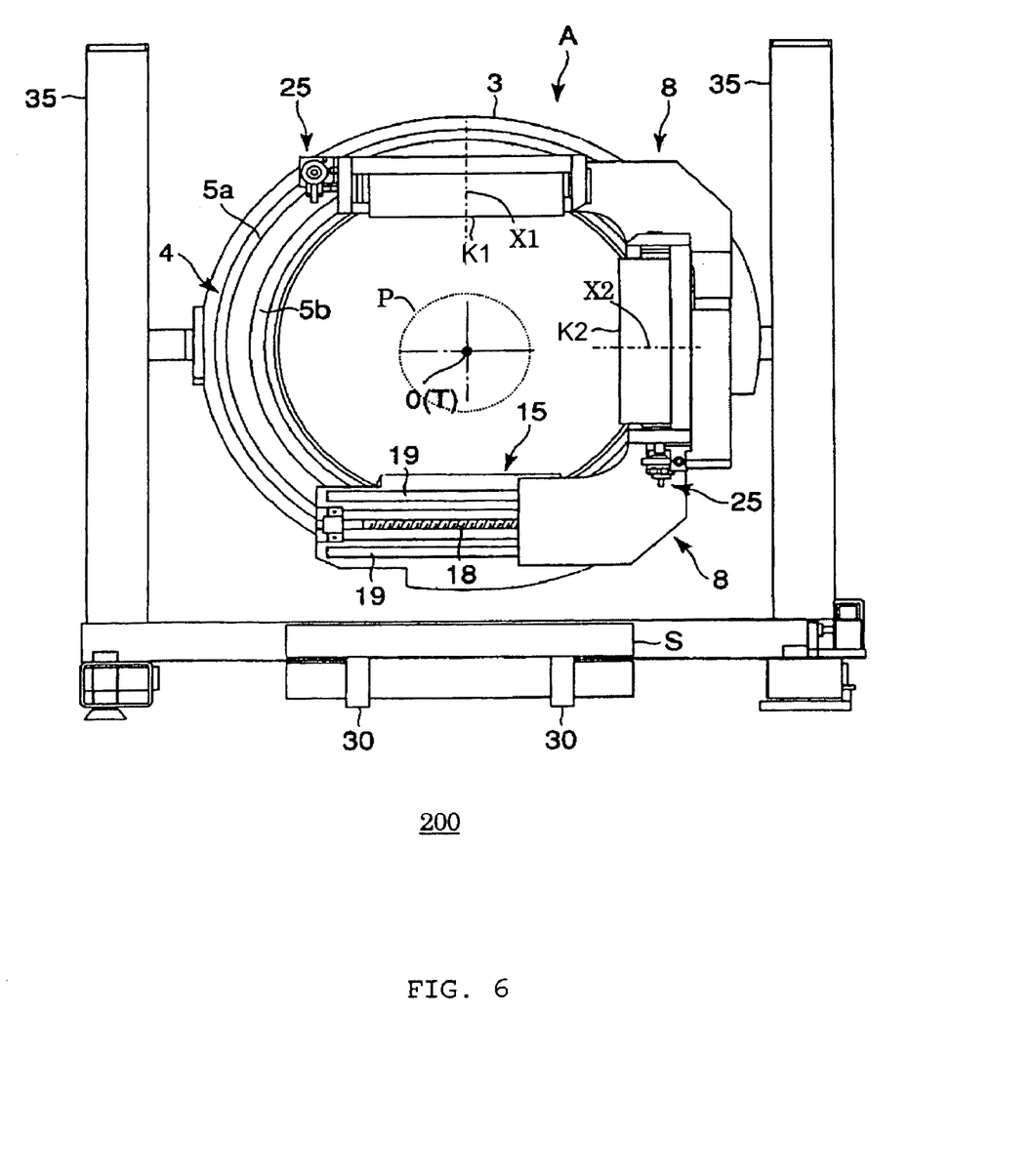
FIG. 6 is a plan view of a second embodiment of a nuclear medical diagnostic apparatus.
Figure 7:
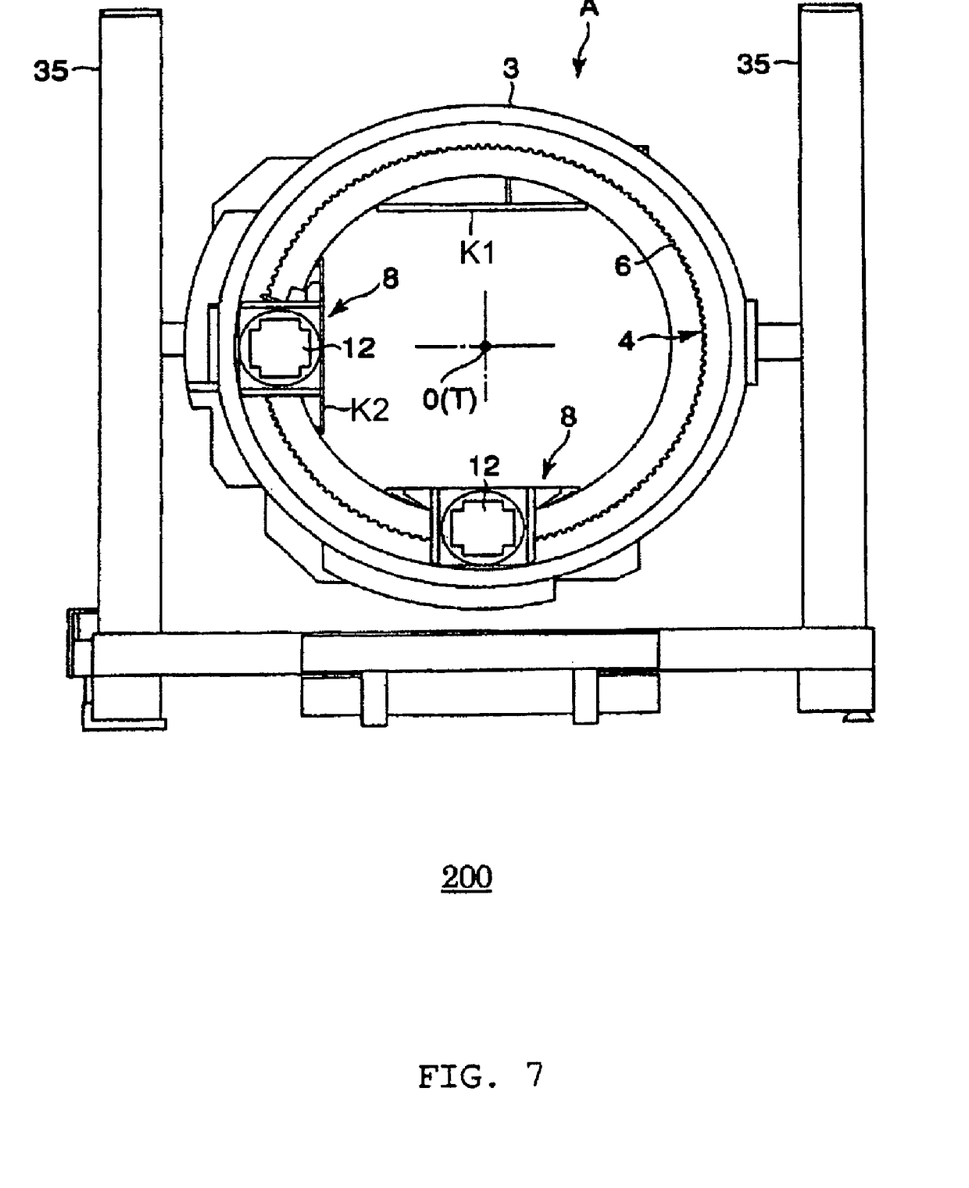
FIG. 7 is a back view of the nuclear medical diagnostic apparatus shown in FIG. 6.
Figure 8:
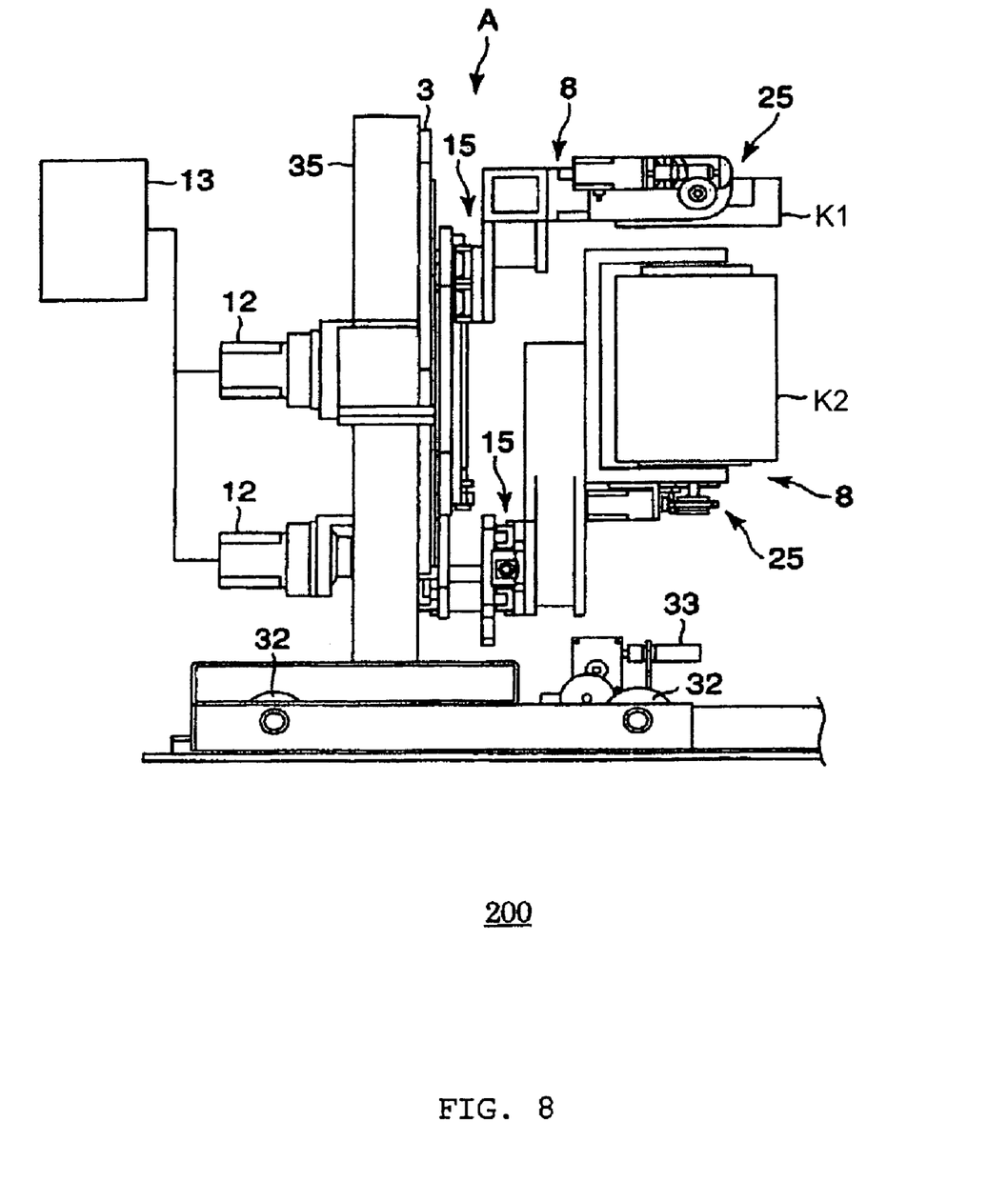
FIG. 8 is a side view of the nuclear medical diagnostic apparatus shown in FIG. 6.
Figure 9:
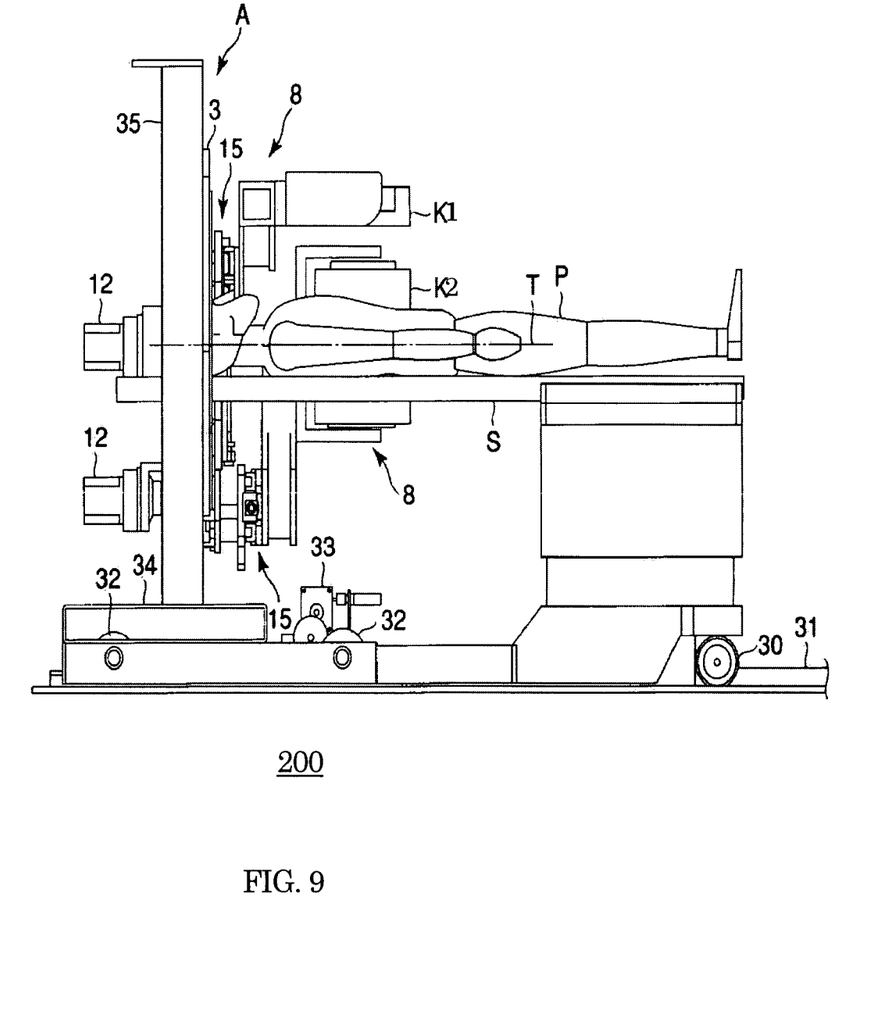
FIG. 9 is a side view of the nuclear medical diagnostic apparatus shown in FIG. 6 during a diagnosing.
Figure 10:
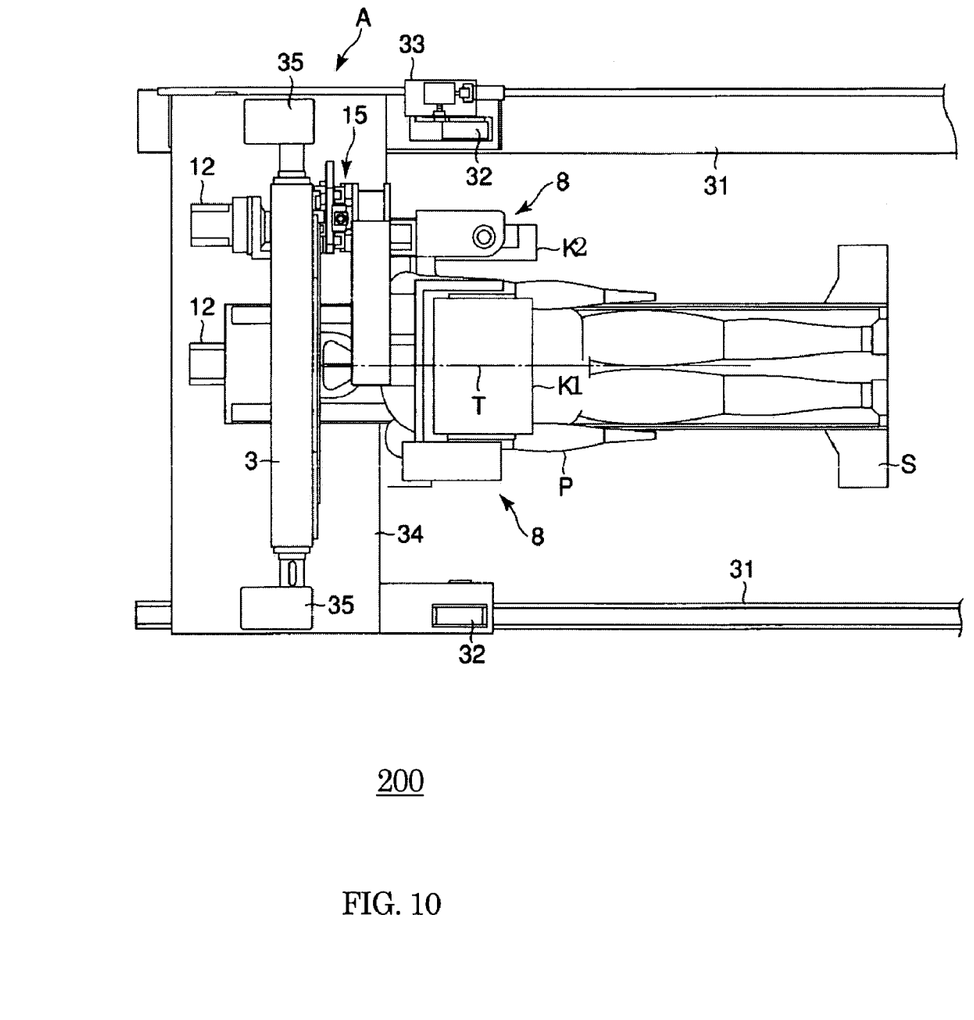
FIG. 10 is a plan view of the nuclear medical diagnostic apparatus shown in FIG. 6 during a diagnosing.

FIG. 6 is a front view of apparatus 200. FIG. 7 and FIG. 8 are a back and side view of apparatus 200. FIG. 9 and FIG. 10 are a side and plan views of apparatus 200 at the time of a diagnosis of a subject P.

Subject P (FIG. 9) is on a berth S with a conveyer 30, conveyed to a room where apparatus 200 is installed. There is a pair of rails 31 in the room in advance. Conveyer 30 is fixed by a stopper (not shown) during a diagnosis after being set to a position between rails 31.

Apparatus 200 is provided with a moveable base 34 having plural wheels 32 fitted with rails 31, and a driving mechanism 33 to rotate wheels 32. Driving mechanism 33 operated according to driving instructions, linearly moves moveable base 34 to any position along rails 31.

A pair of legs 35 is separately provided in parallel with each other, supporting a circular ring 3. Center axis O (FIG. 7) of ring 3 is the same height from a floor as that shown in the first embodiment. The berth is set in the manner that the body axis T of subject P on the berth is approximately aligned with center axis O.

A guide mechanism 4 has the approximately same structure as that shown in the first embodiment. Namely, guide mechanism 4 is provided with a first circular guide rail 5a (FIG. 6), a second circular guide rail 5b with a different inside diameter from that of first guide rail 5a, and first gear, such as a sun gear 6 (FIG. 7) provided on a back face of ring 3.

As shown in FIGS. 6 and 8, two detector sustention parts 8 which respectively support separate detectors K1 and K2, are respectively attached to ring body 3. The structure of sustention part 8 is the same as that shown in the first embodiment. Each sustention part 8 is moveable along guide mechanism 4.

Each sustention part 8 is also provided with an adjustment mechanism 15 to make detectors K1 and K2 approach or withdraw from subject P, and an automatic driving mechanism 25 to rotate detectors K1 and K2 on their axes.

One sustention part 8 is arranged so as to let one detector K1 face with the top face of subject P (FIGS. 9 and 10). The other sustention part 8 is arranged so as to let the other detector K2 face with a side face of subject P. That is, detectors K1 and K2 are arranged in 90-degree interval. In addition, referring to FIG. 6, the center axes X1 and X2 of both the detectors K1 and K2 are aligned with subject P to pass through a body axis T of subject in a front view.

SPECT data having a 90-degree phase difference from each other, can be acquired using two detectors K1 and K2.

Moving two sustention parts 8 at the same speed in the same direction, makes it possible to detect gamma rays from many directions. Then, apparatus 200 can effectively acquire SPECT data.

So called a whole-body diagnosis, i.e., scanning subject P in the body axial direction using detectors K1 and K2 without rotating in the circumferential direction, is also possible. An additional detector k3 may concurrently acquire SPECT data by moving in the circumferential direction of ring 3. In this manner, concurrently manipulating these detectors promotes efficiency of diagnosis, and is fewer burdens for a patient (subject P).

In addition to concurrently manipulating these detectors, it is also possible to synchronously control sustention part 8, adjustment mechanism 15 and detectors K1 and K2.

It is further possible to move one detector K1 in the circumferential direction of ring 3 while the other detector K2 remains stationary. The other detector K2 may stop detecting, if necessary.

Supporting legs 35 may have a lifting mechanism (not shown) to adjust the height of center axis O of ring 3. A mechanism for adjusting the ascending vertical angle of ring 3 may be added, too. Further, a mechanism for switching the rotative direction of sustention part 8 may be added.

Apparatus 200 makes it possible to diagnose subject P not only in face-up position, but also in sitting position and standing position. Diagnosing subject P in sitting position reduces oppression against a heart caused by a diaphragm. As a result, a clear image can be obtained.

Using apparatus 200, three-dimensional static images, SPECT data acquisition and coincident data acquisition of subject P in sitting or standing position, can be realized.

The number of detectors K may be changed. Three detectors to detect radiation are applicable to a nuclear medical diagnostic apparatus. Four detectors can be also applicable by simplifying each structure of each element of a nuclear medical diagnostic apparatus.

What is claimed is:

1. A method for detecting radiation emitted from a radiation source within a subject, comprising:
   positioning the subject inside a stationary ring by moving a base in a linear direction approximately parallel to a body axis of the subject, the ring including a first internal gear;
   changing a distance between the subject and a first radiation detector by
      rotating a second gear to move an arm base along a circumferential direction of the ring, the second gear being engaged with the first internal gear and the arm base being attached to a first moving component,
      rotating the first moving component to move a second moving component along a tangential direction of the ring, the second moving component being coupled to a table supporting the first radiation detector, and
      rotating the first radiation detector about the body axis; and detecting the radiation using the first radiation detector.

2. The method for detecting radiation according to claim 1, further comprising:
   rotating the first radiation detector about a detector axis.

3. The method for detecting radiation according to claim 2, wherein the step of rotating the first radiation detector about the detector axis includes rotating the first radiation detector about the detector axis whose direction is approximately orthogonal to the direction of the body axis.

4. The method for detecting radiation according to claim 1, wherein the radiation is gamma radiation.

5. The method for detecting radiation according to claim 1, further comprising:
   a second radiation detector to detect the radiation.

6. The method for detecting radiation according to claim 1, wherein the step of rotating the second gear includes rotating a planet gear about the body axis along with the first radiation detector, the planet gear being engaged with an internal sun gear formed circumferentially centering the body axis.

7. The method for detecting radiation according to claim 1, wherein the step of rotating the first moving component includes rotating a ball screw on a ball screw axis to move the first radiation detector in the direction of the ball screw axis along with table coupled to a thread receiving the ball screw.

8. The method for detecting radiation according to claim 7, wherein the step of rotating the first moving component further includes rotating the ball screw on the ball screw axis approximately orthogonal to the direction of the body axis.

9. The method for detecting radiation according to claim 7, wherein the step of rotating the first radiation detector includes rotating the first radiation detector about a detector axis orthogonal to both the body axis and the axial direction of the ball screw.

* * * * *